United States Patent Office 2,953,976
Patented Sept. 27, 1960

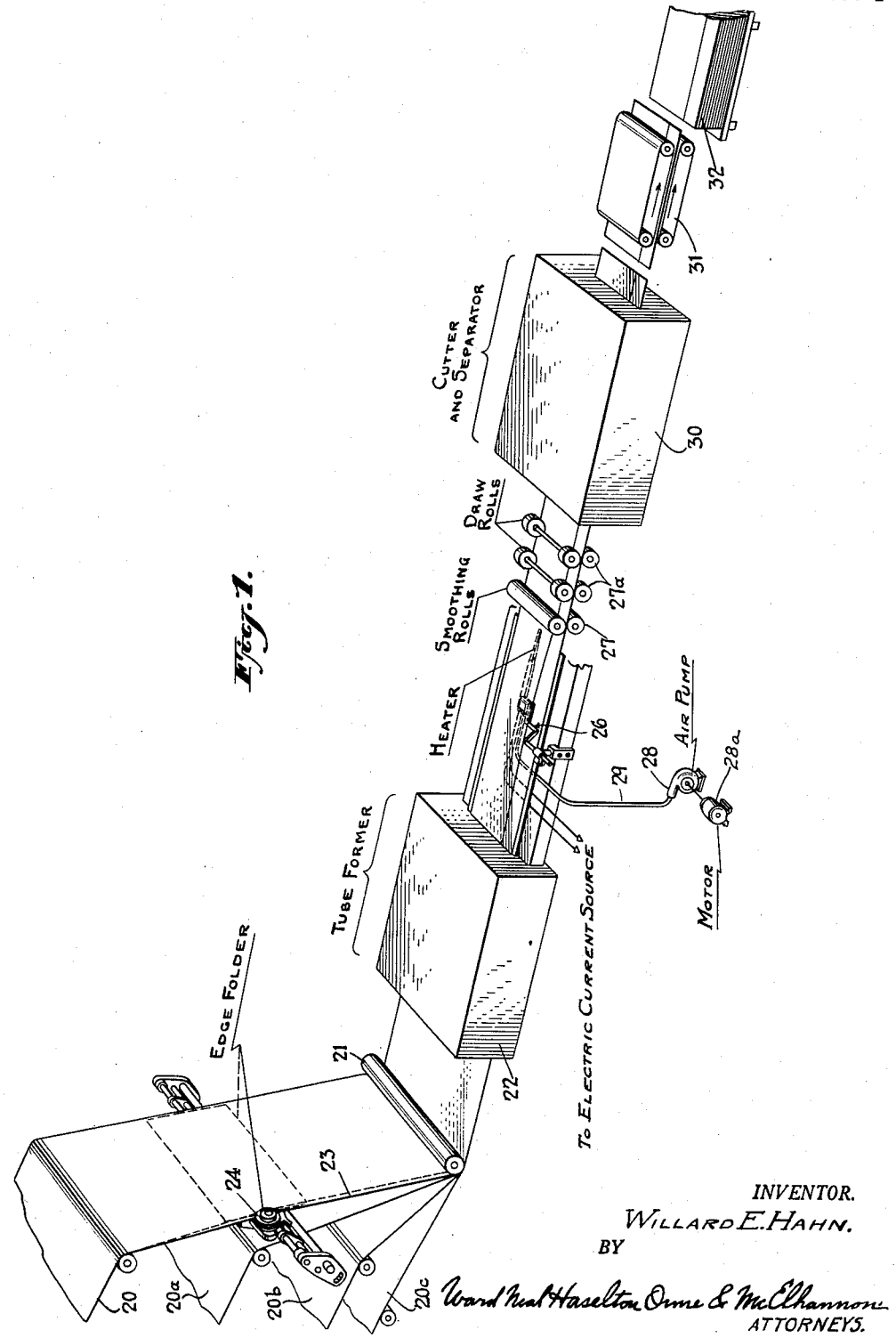

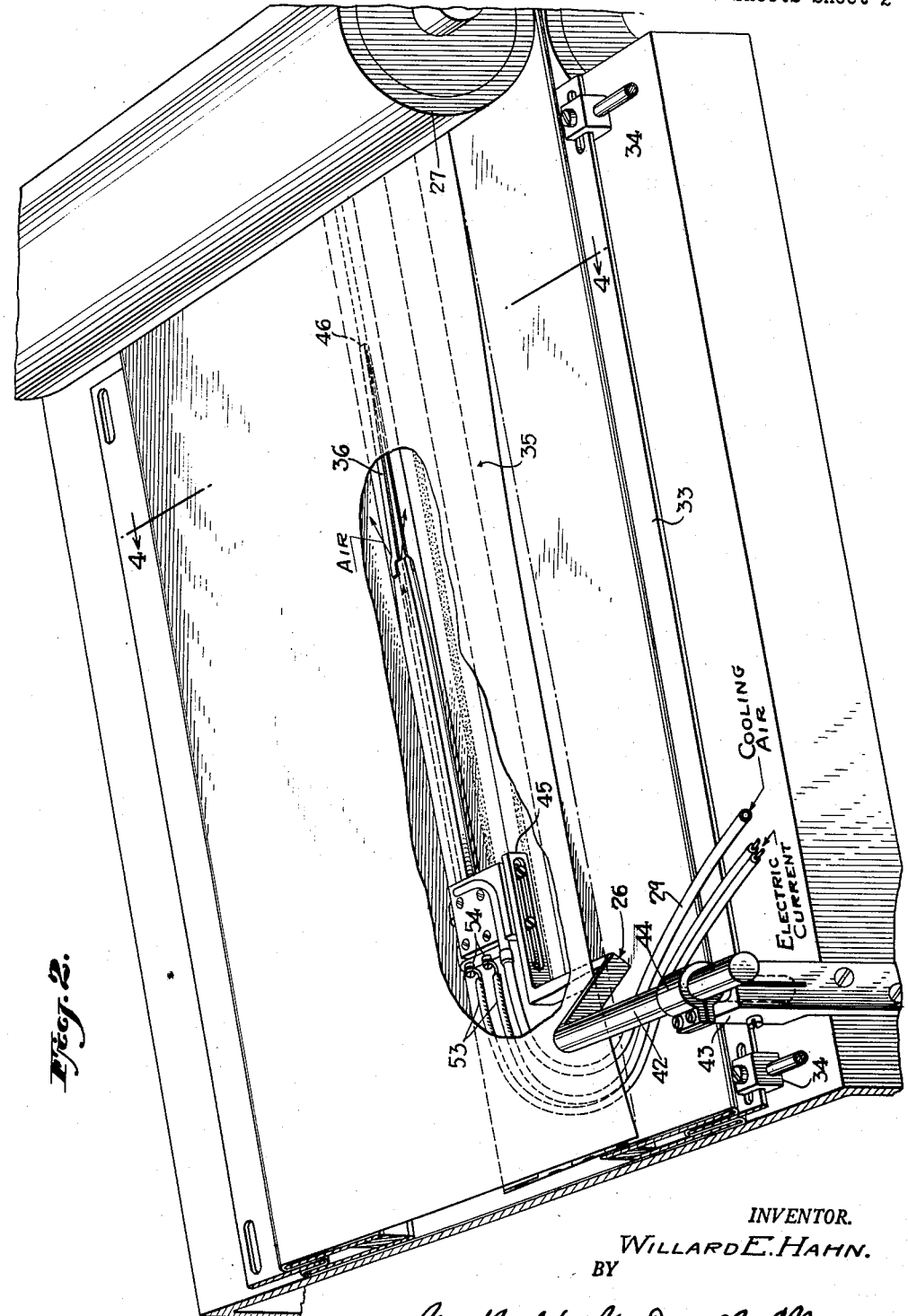

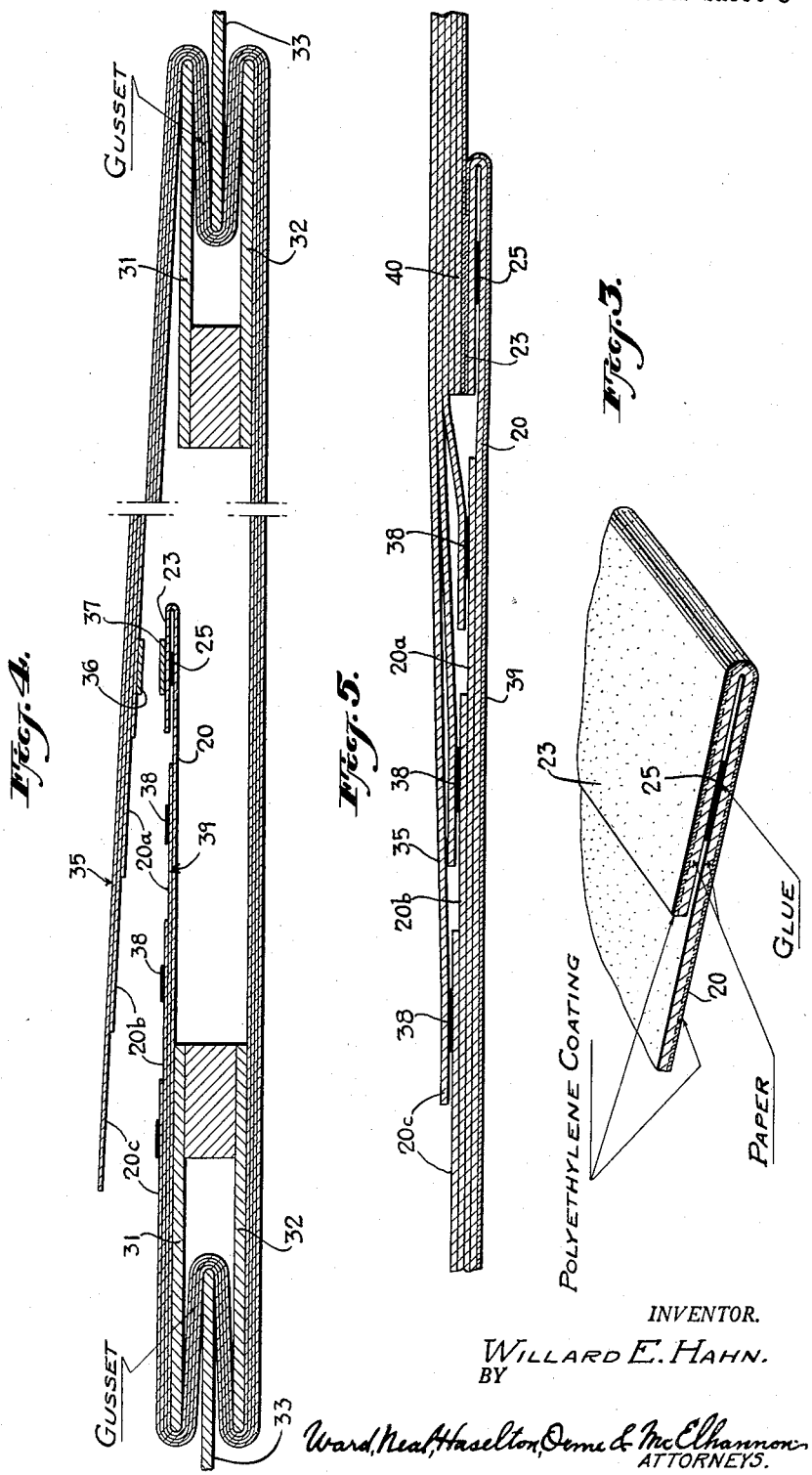

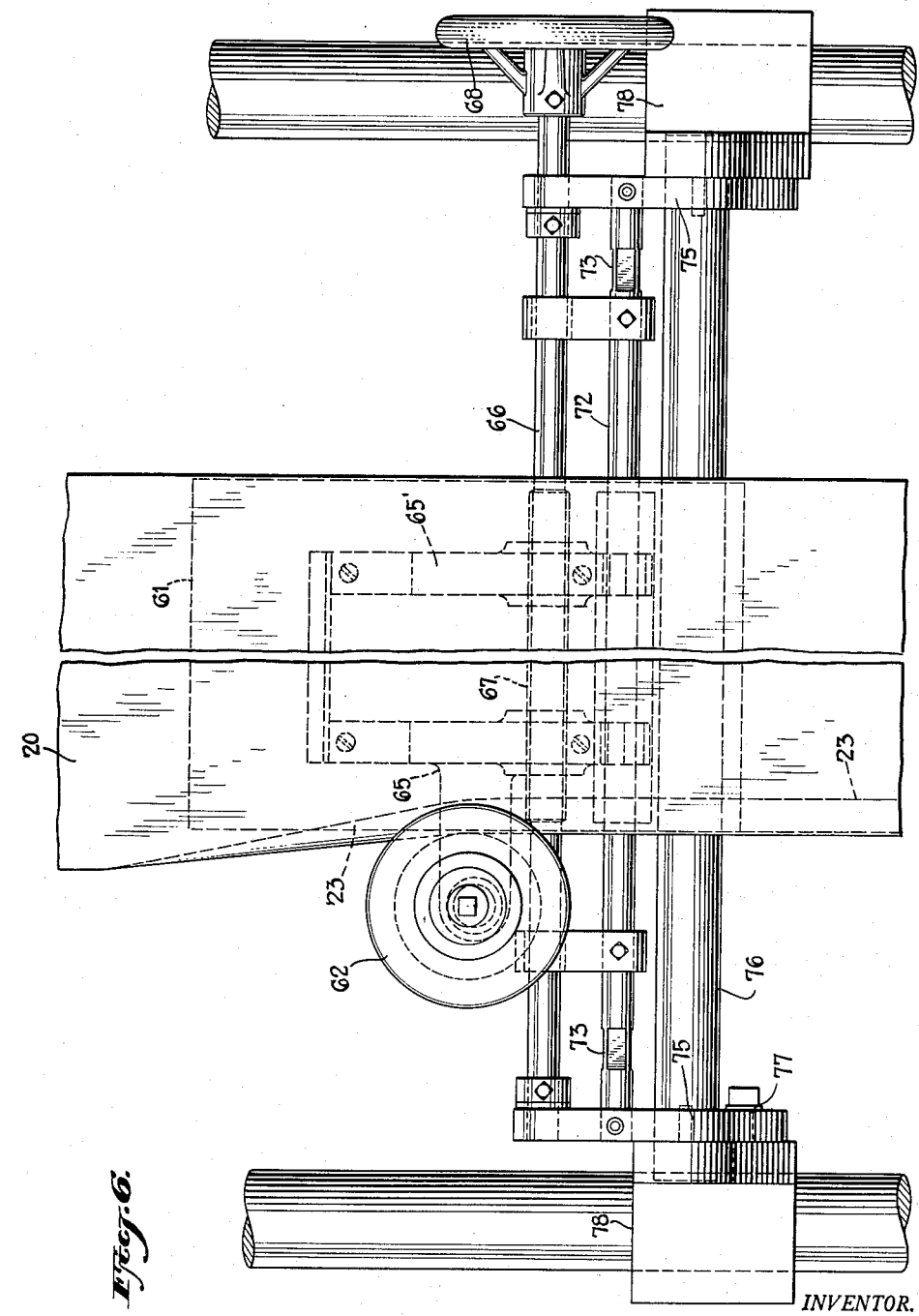

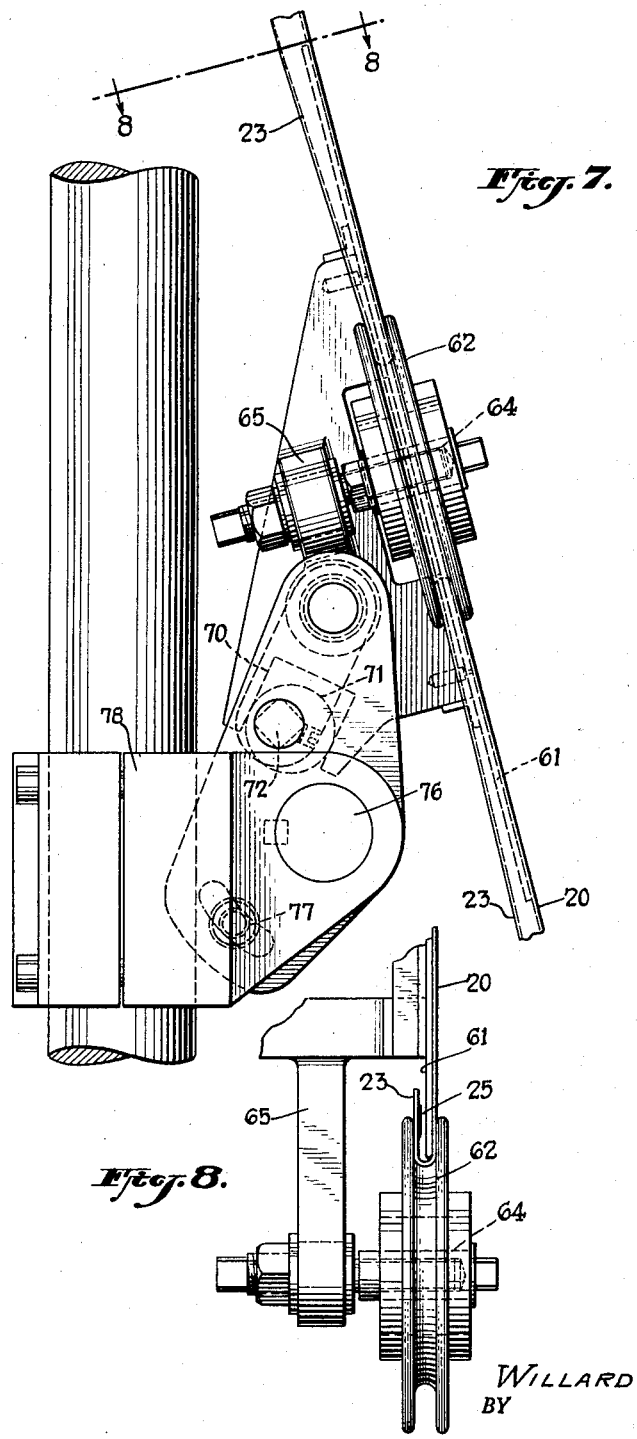

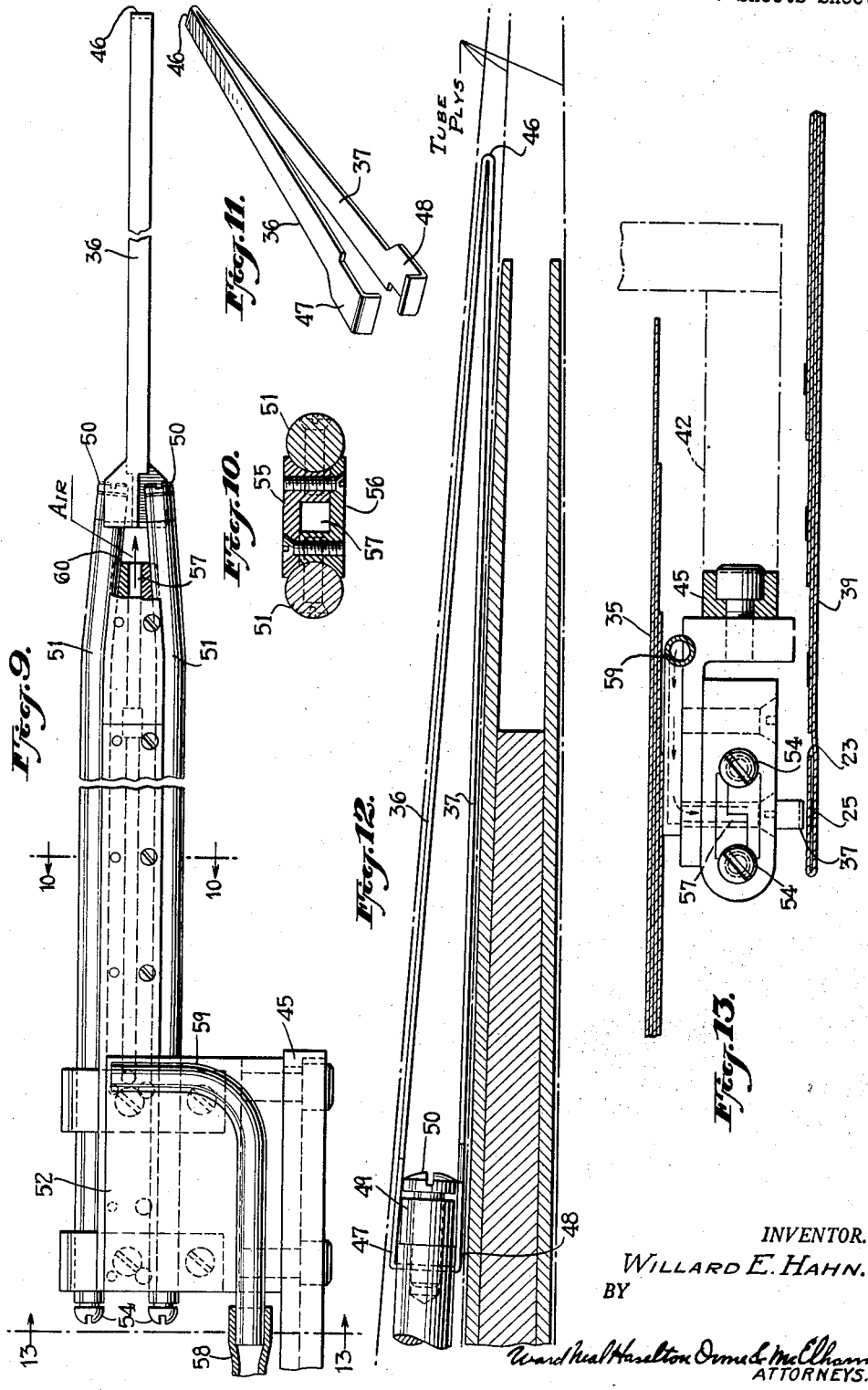

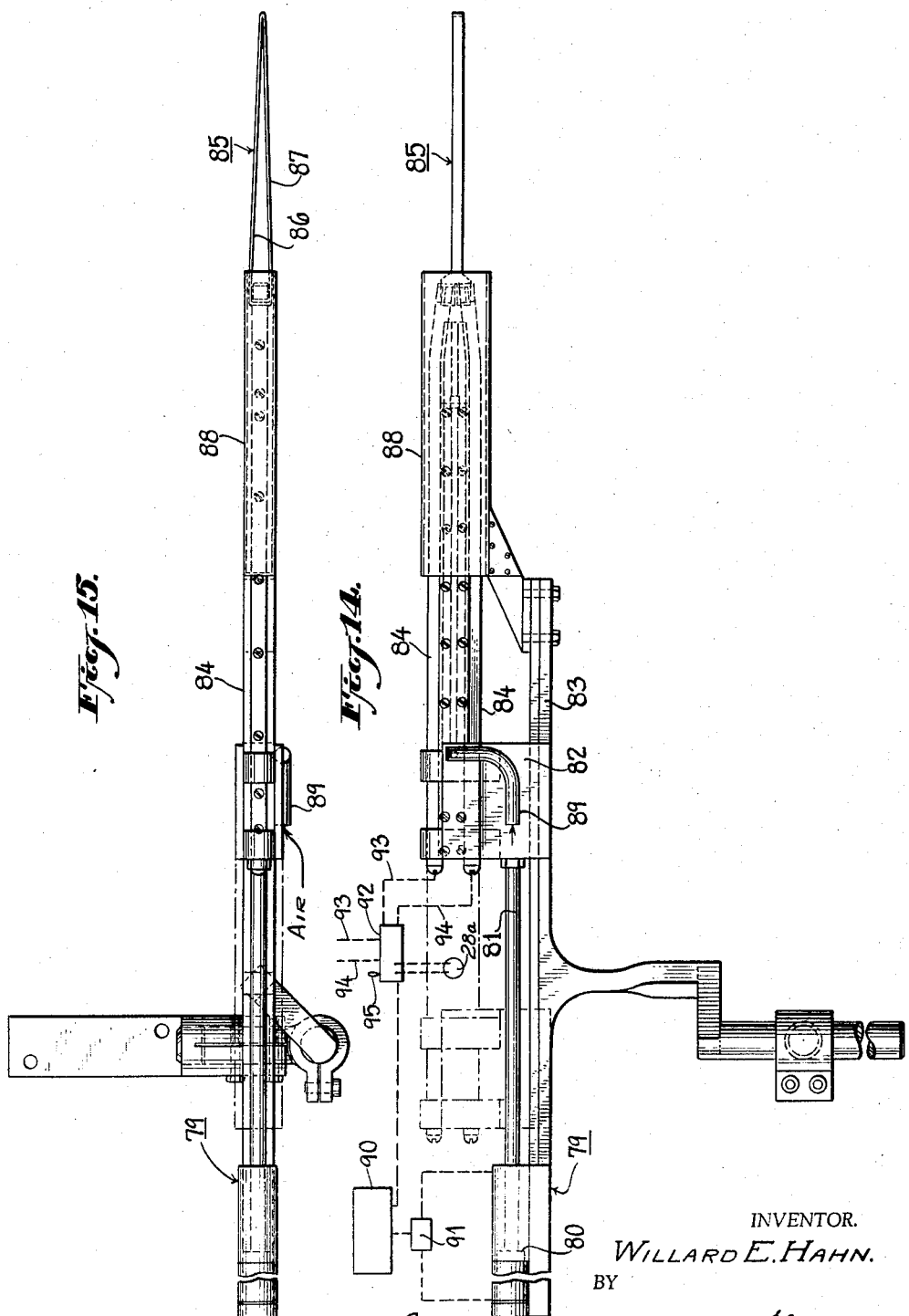

2,953,976

METHOD AND APPARATUS FOR FORMING SEAMS IN MULTIWALL BAGS

Willard E. Hahn, Pensacola, Fla., assignor to St. Regis Paper Company, New York, N.Y., a corporation of New York Filed Jan. 3, 1956, Ser. No. 557,203

9 Claims. (Cl. 93—8)

This invention relates to a method and apparatus for forming seams in multiwall bags or shipping sacks and the like and more particularly such bags of types wherein one of the plies or a film adhered to one of the plies of paper, for example, comprises thermoplastic material.

For some time it has been the practice to manufacture certain types of multiwall paper shipping sacks with an inner ply which has adhered thereto a film of thermoplastic material such as polyethylene to form a liner which will be impervious to moisture and which will resist attack either by chemical or fungus materials contained in the bags. Such bags are usually formed by feeding a plurality of superposed paper webs into a bag tubing machine which automatically applies certain lines of glue or adhesive to form the seams and delivers the webs to a tube former portion of the machine in laterally offset positions so that as the continuous tube is formed from the superposed webs there will be a longitudinally extending seam with the edges adhered together in stepped relation. The continuous tube is separated into bag lengths at a further point in the machine. Thus if the inner ply of such bag tube carries on its inner surface a thermoplastic film or liner ply, then such film on the overlying edge portions of the seam will become adhered not to the thermoplastic film on the underlying edge of the seam but to an edge or strip of paper, thus leaving a paper edge of the underlying ply exposed to the contents of the bag and possibly leaving the inner line of adhesive more or less exposed to deterioration caused by the contents of the bag. And in any event there will not be a thermoplastic film closure impervious to moisture along the longitudinal seam of the bag tube. To overcome this difficulty it has been proposed to fold an edge portion of the inner ply bearing the thermoplastic film outwardly and onto itself so as to present a band of the plastic film for direct sealing to the plastic film on the inner surface of the overlying portion of the longitudinal seam. But the problem of heat sealing such contacting film-to-film areas in the longitudinal seam of a multiwall paper bag presents quite troublesome difficulties which so far as known have not heretofore been satisfactorily solved. That is, if the film-to-film portions which come into contact could be directly heated from the exterior of the bag tube, the seam could be readily sealed together by applying heating means to the exterior of the finished tube. However, with the usual multiwall shipping sacks which often are made with from three to six plies of heavy kraft paper, for example, such paper plies will provide sufficient insulation to preclude the rapid transfer of sufficient heat therethrough to seal a film-to-film closure as an impervious seam on the inside of the bag. And as the bag tubes are ordinarily made by cutting into bag lengths a continuously formed multi-ply tube after the longitudinal seam of the tube is completed, the problem of obtaining access for applying heating means to the inside of the folded continuous tube for the purpose has been one of the particularly difficult problems above referred to.

In accordance with the present invention, however, a method and apparatus is provided with which this problem has been quite satisfactorily solved by the use of relatively simple attachments adapted to be mounted on standard forms of bag tubing machines and permitting the usual rapid rate of production of the multi-ply bag tubes with a heat sealed film-to-film longitudinal seam in its liner.

In summary the method comprises folding over one edge of the inner web bearing the thermoplastic film at a time before the web passes into the tube former and then after the formed tube has left the tube former and before the glue lines in the longitudinal seam have been brought firmly into adhering position, the seam is opened enough to allow a suitable electrical heating means to be positioned therein with a heating element thereon inserted between the plastic areas which are to form the film-to-film seal. The parts are thus arranged so that the film areas to be sealed together rapidly slide over the upper and lower surfaces respectively of the hot heating element just before the continuous tube passes to the so-called smoothing rolls of the tubing machine and between which rolls the longitudinal seam becomes firmly pressed into permanent sealed condition. The various steps of the method might be performed manually, by proper manipulation of the heating element but for the usual, regular and rapid manufacture of bags, the automatically operating equipment such as herein described is, of course preferred.

In order to minimize fire hazards, the above-mentioned heating element is also preferably accompanied by means for injecting cooling air around the region of the hot heating element whenever the operation of the machine is interrupted. Alternatively, the fire hazard may be still further lessened by employing a simple air cylinder or solenoid actuated mechanism which will automatically retract the heating element into a protective sheath when the tubing machine and/or tube formed thereby stops or slows to a predetermined speed below which a fire hazard may exist.

Other objects, features and advantages of the invention will appear from the more detailed description given below, taken in connection with the accompanying drawings, which form a part of this specification.

In the drawings:

Fig. 1 is a perspective view of a bag tubing machine equipped with apparatus in accordance with the invention;

Fig. 2 is a perspective view showing in further detail the position and general construction of the film-to-film heating means;

Fig. 3 is a sectional view of a folded over edge portion of an inner paper ply of a bag having adhered thereto a film of plastic material which is to form the longitudinal film-to-film seam;

Fig. 4 is a sectional view taken substantially along line 4—4 of Fig. 2;

Fig. 5 is an enlarged cross-sectional view of a finished longitudinal seam in a bag as made in accordance with the invention;

Fig. 6 is a front elevational view of the mechanism for preliminarily folding over an edge of the inner ply for a bag tube;

Fig. 7 is a side elevational view of the mechanism of Fig. 6;

Fig. 8 is a view taken substantially along line 8—8 of Fig. 7;

Fig. 9 is a plan view of the seam heating assembly and its supporting parts;

Fig. 10 is a sectional view taken substantially along line 10—10 of Fig. 9;

Fig. 11 is a perspective view of the heating element itself;

Fig. 12 is a large vertical sectional view of the device of Fig. 9 and showing its relationship to the bag tube plies when in use;

Fig. 13 is a sectional view taken substantially along line 13—13 of Fig. 9;

Fig. 14 is a side elevation, partly in section and with parts broken away, of another form of the invention embodying means for retracting the heating element into a protective sheath; and Fig. 15 is a top plan view of the parts shown in Fig. 14.

Referring now to Fig. 1 in further detail, there is here shown by way of example four webs of paper 20, 20a, 20b, 20c being advanced over suitable rollers, thence under an assembly roller 21 and into a tube former of conventional construction located at 22. It will be understood that the webs, while running through previous portions of the tubing machine, have applied thereto the usual lines of adhesive for forming the longitudinal seam in the bag tubing and, if desired, the previous parts of the machine may include conventional equipment for applying lines of cross-pasting for certain types of bags and also perforators, if desired, for perforating webs at bag length intervals particularly if the tubing is to be made into stepped end bags.

The web 20 which is to form the innermost ply of the bag tube has adhered thereto on its upper surface, as viewed at the lefthand end of Fig. 1, a film of thermoplastic material, such as polyethylene and the first step in forming the film-to-film seam in accordance with the invention is to fold over an edge of this ply, as indicated at 23 and as is more clearly shown in Fig. 3. For this purpose an edge folding device, as at 24, is mounted in any convenient location on the tubing machine in advance of the tube former. Such device, for example, may be conveniently mounted on the cross-pasting part of the apparatus in conventional forms of tubing machines. Before the web 20 reaches the device 24, a longitudinal line or band of glue or adhesive will have been applied thereto along the surface which is to be folded over and so that after same has been folded over such glue band will be positioned as indicated at 25 (see Fig. 3).

As the folded continuous tube emerges from the tube former 22, the portions of the longitudinal seam areas which are to overlie the inner areas will be resting lightly upon the latter or the seam areas will be partly opened, as shown in Fig. 4, so that at this region the film-to-film seam heating apparatus, as at 26 (Fig. 1) may project into the seam whereby it will be lightly engaged on its upper and under surfaces respectively by the upper and under seam portions. Since the continuous tube is traveling at a speed of many feet per minute past this heating means, the heating element may be maintained at a cherry red temperature, for example, sufficient to soften the thermoplastic film along the seam line whereby as the film-to-film contact is achieved at a moment later, there will be firm permanent adhesion insured by the passage of the tube through the nips of the smoothing rolls, as indicated at 27 and the draw rolls as indicated at 27a. However, if for any reason the operation of the machine should be interrupted or slowed down excessively, the hot heating element would, in the absence of some cooling means, immediately set fire to the paper of the tubing, or the plastic, or both. To avoid such danger, an air pump, as indicated at 28, is provided for injecting through a pipe 29 to a region about the heating element a sufficient blast of cold air to promptly cool the heater and the adjacent paper and plastic material. The air pump may be driven by a motor 28a as indicated which may be started either by a manual switch when the operation of the tubing machine is slowed down or interrupted or by suitable known forms of automatic switch means which will be thrown responsive to the slowing down of the drive for the tubing machine. Such switch means, whether manual or automatic, also incorporates the electrical control of the heating element itself and disconnects the latter from its electric power supply when the tubing machine slows to an abnormally low speed or stops.

After leaving the smoothing rolls, the tubing passes through the conventional apparatus located at 30 for separating the tubing into bag lengths, such bag lengths being conducted as by a conveyor 31 to a stack thereof as indicated at 32.

Reference will now be had to Figs. 2, 4 and 9–13, inclusive, for a more complete understanding of the seam heating means 26. As the continuous tube leaves the tube former, the gusset areas at the sides thereof may be held in shape, as indicated in Fig. 4, by inner plates, as indicated at 31, 32, and outer plates as at 33. The inner plates may be retained by supporting means located back in the tube former while the outer plates 33 for engaging in the outer folds of the gussets may be supported as by suitable adjustable bracket means 34, as indicated in Fig. 2. The relative positions of the various webs 20—20c at the long longitudinal seam areas when same arrive at the region of the heating means 26 are shown in Fig. 4 including the folded over plastic bearing area 23 on what is to be the underlying and innermost part of the seam. The bands of glue or adhesive are shown in Fig. 4 in cross-section by heavy lines. The overlying portions of the longitudinal seam, indicated at 35, are supported up out of contact with such glue lines by reason of the presence of the heating equipment 26. As further indicated in Fig. 4, upper and lower portions 36 and 37 of the heating element are slidably engaged by the plastic film areas respectively which are about to come into adhered film-to-film contact when the tubing passes on between the smoothing rolls 27 and draw rolls 27a which also, of course, cause all of the overlying areas 35 of the seam region to be brought down into film adhering relation to the glue lines 38 on the underlying seam areas 39.

The seam will then be in the condition shown in somewhat enlarged cross-section in Fig. 5 wherein the film-to-film heat sealed seam is indicated at 40.

The heating apparatus, as above shown in Fig. 2, is carried on an adjustable angularly shaped supporting arm 42 which in turn may be carried by a supporting post 43 having a clamp 44 permitting the arm to be adjusted transversely of the bag tube or to be swung, if desired, to bring the heating element either into horizontal position or positions at slight angles to the horizontal, if desired, for more smooth engagement with the tube seam areas. At its inner end the arm 42 may have adjustable screw and slot means, as at 45, permitting the heating element to be adjusted in directions longitudinally of the tubing.

As best shown in Figs. 9–11, the heating element itself comprising the two upper and lower portions 36 and 37 may be formed of a ribbon of any suitable known form of alloy to provide an electrical resistance, such ribbon being folded over to provide a forward apex end 46. Thus the heating element has a shape in the nature of a bayonet so as to project toward or into the area of the film-to-film seal while its upper and lower surfaces are being slidably engaged by the plastic film over a considerable distance of travel which may, for example, be about 14 inches.

The rear ends 47, 48 of the heating element are suitably angularly shaped, as shown in Fig. 11, to be embraced by clamping elements 49 held by screws, as at 50, to the ends of a pair of hollow rods, as at 51. These rods extend back to suitable supporting structure, as at 52, which in turn, as above indicated, has a slot and bolt adjustable connection 45 with the supporting arm 42.

Electrical wires as at 53 (Fig. 2) coming from a suitable source of heating current may be connected to terminal screws 54 in the rods 51 respectively which may contain the wires running to the screws 50 thereby bringing the current to the ends 47, 48 of the heating element. It will be understood that the various parts above referred to are suitably insulated at proper points so as not to short circuit the electrical connections. The rods 51 may, if desired, comprise the electrical connections if the parts supporting same are of insulation material.

Between the rods 51 upper and lower members 55 and 56 are held together as by screws and serve conjointly to provide a passage 57 for introducing air from a hose connection 58 (which runs to pipe 29 above referred to) and discharges air through a tube 59 and thence into such cavity 57 from which a jet of air emerges at 60 as indicated in Fig. 9 when the air pump 28 is operated as above explained.

Reference will now be had to Figs. 6–8 illustrating one example of the type of device located at 24 as referred to in connection with Fig. 1 for folding over the edge portions of the inner plastic bearing ply. While other forms of folding means for that purpose might, of course, be used, the operation of the example here shown may best be understood by reference to Fig. 8 where it will be noted that the inner ply 20 is sliding down over a plate 61 while the edge portions of the ply are being engaged by a grooved idler pulley 62 so that the edge 23 bearing the band of glue 25 is turned around in back of the plate, such folding over taking place gradually as the edge of the web passes down to the grooved pulley 62 and as will be evident from Figs. 6 and 7.

The pulley 62 may be mounted upon a shaft 64 affixed to a bracket 65 which should preferably be universally adjustable as to position in any suitable way to accommodate webs of different dimensions or to properly engage same when the web position may be adjusted for any reason.

With the construction shown, the bracket 65 is pivotally mounted about a shaft 66, this shaft being threaded at 67 for threaded engagement with the two bracket portions 65, 65'. The shaft has a handwheel 68 enabling same to be rotated for the purpose of adjusting the pulley 62 and its supporting bracket in directions transversely of the web.

In order to adjust the angular position of the pulley 62 with respect to the vertical, the bracket 65 may be formed with a yoke portion 70 which embraces a cam 71 mounted on a shaft 72 which has squared portions as at 73 adapted to be engaged by a wrench, for example, so as to turn the shaft thereby turning the cam 71 and acting to tilt the bracket structure 65.

The shafts 66 and 72 may be supported at their ends as by brackets 75 which may be adjustably turned about a supporting shaft 76 and secured as by a bolt and slot connection 77 with respect to supporting brackets 78.

Referring now to Figs. 14 and 15, there are shown electrical heater means which are analogous and substantially identical to the means shown in Figs. 1, 2 and 9–12 inclusive, with the exception that means are provided for retracting the heating element into a protective sheath in response to a stopping or slowing of the tubing machine and/or the tube formed thereby, such slowing being to a predetermined speed below which a fire hazard may exist.

Such retracting means may be of the type mentioned above, including, for example, air cylinder means or a solenoid actuated mechanism.

In the form shown in Figs. 14 and 15, air cylinder means 79 are employed having a piston 80 and a piston rod 81. The latter rod is secured at its outer extremity to a carriage 82 mounted slidably upon a track 83, such carriage 82 mounting two rods 84 analogous to the two rods 51 shown in Fig. 9. A heater element 85 is secured at the outer extremity of the rods 84 in a manner also analogous to that shown in Figs. 9 and 11. The heater element 85 thus, for example, is of bayonet-like configuration.

The heater element consists of portions 86 and 87 respectively analogous to portions 36 and 37 of Fig. 11.

A protective sheath 88 is stationarily mounted relative to the heating element 85 and positioned in such a manner that the latter element can be withdrawn therein in response to actuation of the air cylinder means 79.

Such protective sheath, for example, may be of asbestos or any other suitable material.

A coolant fluid, such as air, is directed upon the heating element 85 via a conduit 89 in a manner substantially identical to that shown and described in connection with Fig. 9.

The heating element withdrawing means 79 are actuated in response to speed sensitive means schematically indicated at 90 (Fig. 14). The latter means is operatively associated with the equipment in such a way that it is responsive to the speed of the tubing machine and/or the tube formed thereby. Such means 90 are operatively connected to an air cylinder control valve 91, the latter in turn being operatively interconnected to the air cylinder means 79 in a conventional manner.

The speed sensitive means 90 thus may be sensitive to the speed of the tube itself or to some portion of the tubing machine such as the draw rolls 27a. The means 90 can be adjusted to actuate the valve 91 to energize the air cylinder means 79 thereby to withdraw the heater element 85 into the protective sheath 88 in response to the tube slowing to some selected speed.

Referring again to Fig. 14, the speed sensitive means 90 are operatively connected to suitable switch means 92 which are interposed in the electrical conduits 93 and 94 which provide power to the heating element 85. The switch 92 can be automatically controlled by the aforementioned speed sensitive means 90 in such a manner that electrical energy is interrupted to the heating element 85 when the tubing machine slows to an abnormally low speed or stops. If desired, the switch means 92 can be manually actuated by means of a handle 95. Thus there are provided a suitable form of automatic switch means which disconnects the heating element from its source of electric energy responsive to the stopping or the slowing down of the drive for the tubing machine, such slowing being to a predetermined speed below which a fire hazard may exist.

Note that the speed sensitive means 90 can be operatively connected to the tubing machine to sense the operation of such machine below a preselected critical speed or alternatively such means can sense the movement of the tube per se below a critical speed. In either event, such speed sensitive means can be adjusted to actuate the valve 91 and/or the switch means 92 automatically in response to a speed at or below the critical preselected value.

Switch means 92 also can be operatively connected to motor 28a (Figs. 1 and 14) for energizing same in response to operation of the tubing machine or movement of the tube below a selected speed under the conditions aforementioned.

Although one embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. In combination with a bag tubing machine of the type having a tube former and smoothing rolls, equipment for forming bag tubing thereon in which the inner ply includes a plastic film liner having a film-to-film heat sealed longitudinal seam, said equipment comprising: means in advance of the tube former for continuously folding over an edge portion of the inner ply so that the film thereon will come into contact with the film on the other edge of said ply in the finished seam; supporting means on the machine subsequent to the tube former and in advance of the smoothing rolls for protruding in between the longitudinal edges of the ply which edges are to be adhered together, and an electrical heating means having two heating surfaces, said heating means being carried by said supporting means and positioned to be slidably engaged on one heating surface by the film on said folded-over edge and on its other heating surface by the film on said other edge.

2. A combination in accordance with claim 1, and in which means is provided for projecting cooling fluid into the region of said heating means between the edges of the plies in response to operation of said machine at a speed at which danger of burning the film exists in the absence of such projecting of the cooling fluid.

3. In combination with a bag tubing machine of the type having a tube former and smoothing rolls, a heating device adapted to be disposed between superposed longitudinal edges of the web of a traveling length of bag tubing which edges are to be pressed and adhered together to form a longitudinal seam having a film-to-film seal of thermoplastic in such seam, said device being located between the tube former and smoothing rolls and comprising: an elongated electrical resistance heating element, means for supporting same between said superposed edges of the traveling bag tubing for direct contact with both of said edges, a conduit having an outlet positioned to direct a stream of fluid at said heating element, and means for forcing cooling fluid through said conduit and outlet to rapidly cool the heating element.

4. Method for forming bag tubing in which an inner ply thereof includes a plastic film liner having a film-to-film longitudinal seam, which method comprises the following steps: longitudinally and continuously advancing webs which are to form the plies of the tubing, continuously folding over, prior to the region of formation of the tubing, one edge portion of the web which is to form the inner ply so that the film thereon will come into contact with the film on the other edge of said web in the finished seam, folding the advancing webs into substantially the shape of a flattened tube, and at a point where the seam is partially open and before the opposed edges at the seam are permanently adhered together, heating the film surfaces within the seam by heating means inserted within the partially open seam to bring the plastic areas which are to be sealed together in the seam up to adhering temperature, and then closing the seam and applying pressure thereto.

5. A combination in accordance with claim 1 and including a protective sheath that is fireproof at the operating temperature of the heating element, and means for effecting relative movement of the heating element and said sheath whereby the web is protected by said sheath from the heat of the heating element.

6. A combination in accordance with claim 3 and including a protective sheath that is fireproof at the operating temperature of the heating element, and means for effecting relative movement of the heating element and said sheath whereby the web is protected by said sheath from the heat of the heating element.

7. Apparatus in accordance with claim 1 including a protective sheath, means for effecting relative movement between said electrical heating means and said sheath for extending and retracting said heating means, and means for controlling said relative movement thereby to retract said heating means within said sheath in response to said machine operating below a preselected speed.

8. In combination with a bag tubing machine of the type having a tube former and smoothing rolls, equipment for forming bag tubing thereon in which a ply includes a plastic film liner having a film-to-film heat sealed longitudinal seam, said equipment comprising: supporting means on the machine positioned subsequent to said tube former but in advance of said smoothing rolls, an electrical heating element carried by said supporting means and positioned for protruding in between the longitudinal edges of such ply which edges are to be adhered together to produce such seam, such heating element thus being positioned for extending between opposed thermoplastic edges of said ply and toward the direction of travel of the tubing, and a protective sheath for said heating means, means for effecting relative movement between said sheath and heating means, and means for actuating said last-named means.

9. Apparatus in accordance with claim 8 including means for interrupting the flow of electrical energy to said electrical heating means in response to actuation of said actuating means.

References Cited in the file of this patent

UNITED STATES PATENTS

| | | |
|---|---|---|
| 2,256,506 | Wagner | Sept. 23, 1941 |
| 2,289,618 | Young | July 14, 1942 |
| 2,320,564 | Brooks | June 1, 1943 |
| 2,367,725 | Lindh et al. | Jan. 23, 1945 |
| 2,389,560 | Steffens | Nov. 20, 1945 |
| 2,516,612 | Bishop | July 25, 1950 |
| 2,522,346 | Carson et al. | Sept. 12, 1950 |
| 2,542,900 | Chaffee | Feb. 20, 1951 |
| 2,587,211 | Piazze | Feb. 26, 1952 |
| 2,641,166 | Morrell | June 9, 1953 |
| 2,697,474 | McGinley | Dec. 21, 1954 |
| 2,718,915 | Piazze | Sept. 27, 1955 |
| 2,780,275 | Rusch et al. | Feb. 5, 1957 |
| 2,832,271 | Jarund | Apr. 29, 1958 |